(12) United States Patent
Williams et al.

(10) Patent No.: US 9,409,137 B1
(45) Date of Patent: Aug. 9, 2016

(54) CATALYST SUPPORT GRID

(71) Applicant: Woven Metal Products, Inc., Alvin, TX (US)

(72) Inventors: Lawrence L. Williams, Houston, TX (US); Gregorio Castillo, Houston, TX (US)

(73) Assignee: Woven Metal Products, Inc., Alvin, TX (US)

( * ) Notice: Subject to any disclaimer, the term of this patent is extended or adjusted under 35 U.S.C. 154(b) by 0 days.

(21) Appl. No.: 14/627,827

(22) Filed: Feb. 20, 2015

(51) Int. Cl.
*B01J 8/00* (2006.01)
*B01J 8/02* (2006.01)
*B01J 19/00* (2006.01)
*B01J 19/24* (2006.01)
*B01J 19/30* (2006.01)
*B01J 19/32* (2006.01)

(52) U.S. Cl.
CPC ............... *B01J 8/008* (2013.01); *B01J 8/0292* (2013.01); *B01J 2208/00884* (2013.01); *B01J 2208/027* (2013.01)

(58) Field of Classification Search
CPC ............... B01J 8/00; B01J 8/008; B01J 8/02; B01J 8/0292; B01J 19/00; B01J 19/24; B01J 19/245; B01J 19/30–19/325; B01J 2208/00796; B01J 2208/00884; B01J 2208/02; B01J 2208/023; B01J 2208/027; B01J 2219/24; B01J 2219/30; B01J 2219/32–2219/32203; B01J 2219/32237; B01J 2219/32282–2219/32289

See application file for complete search history.

(56) References Cited

U.S. PATENT DOCUMENTS

| | | | | |
|---|---|---|---|---|
| 5,449,498 A | * | 9/1995 | Cetinkaya | C10G 11/18 208/113 |
| 5,779,773 A | * | 7/1998 | Cam | B01D 53/0423 55/418 |
| 2012/0156111 A1 | * | 6/2012 | Ramos | B01J 8/008 422/311 |
| 2013/0064731 A1 | * | 3/2013 | Boyak | B01J 8/025 422/239 |

OTHER PUBLICATIONS

D. Kelling et al., "Improvements to Shift Reactor Operations Based on Computational Fluid Dynamics Modeling", Presentation at the 45th Annual Safety in Ammonia Plants and Related Facilities Symposium Tuscon, Arizona, Sep. 11-14, 2000.

* cited by examiner

Primary Examiner — Natasha Young
(74) Attorney, Agent, or Firm — Blank Rome LLP

(57) ABSTRACT

A support grid for a chemical reactor fixed bed catalyst. The support grid is formed of (i) a center support cylinder, made in areas of a vertical cylinder, that is assembled within the vessel on the bottom closure head; (ii) a peripheral support skirt located at the outer circumference of the grid, assembled in sections inside the reactor pressure vessel, that sets without welding to bottom closure head of the reactor vessel; (iii) a set of radial support arms that extend from the center support structure to the support skirt to tie these sections into a rigid frame to support the catalyst bed support grid wedges; and (iv) a grid or disc formed of a plurality of catalyst bed support grid wedges or sections that are radial in orientation and are assembled inside the reactor pressure vessel to form a disc that is about 80% of the reactor vessel in outside diameter.

28 Claims, 4 Drawing Sheets

SECTION B-B

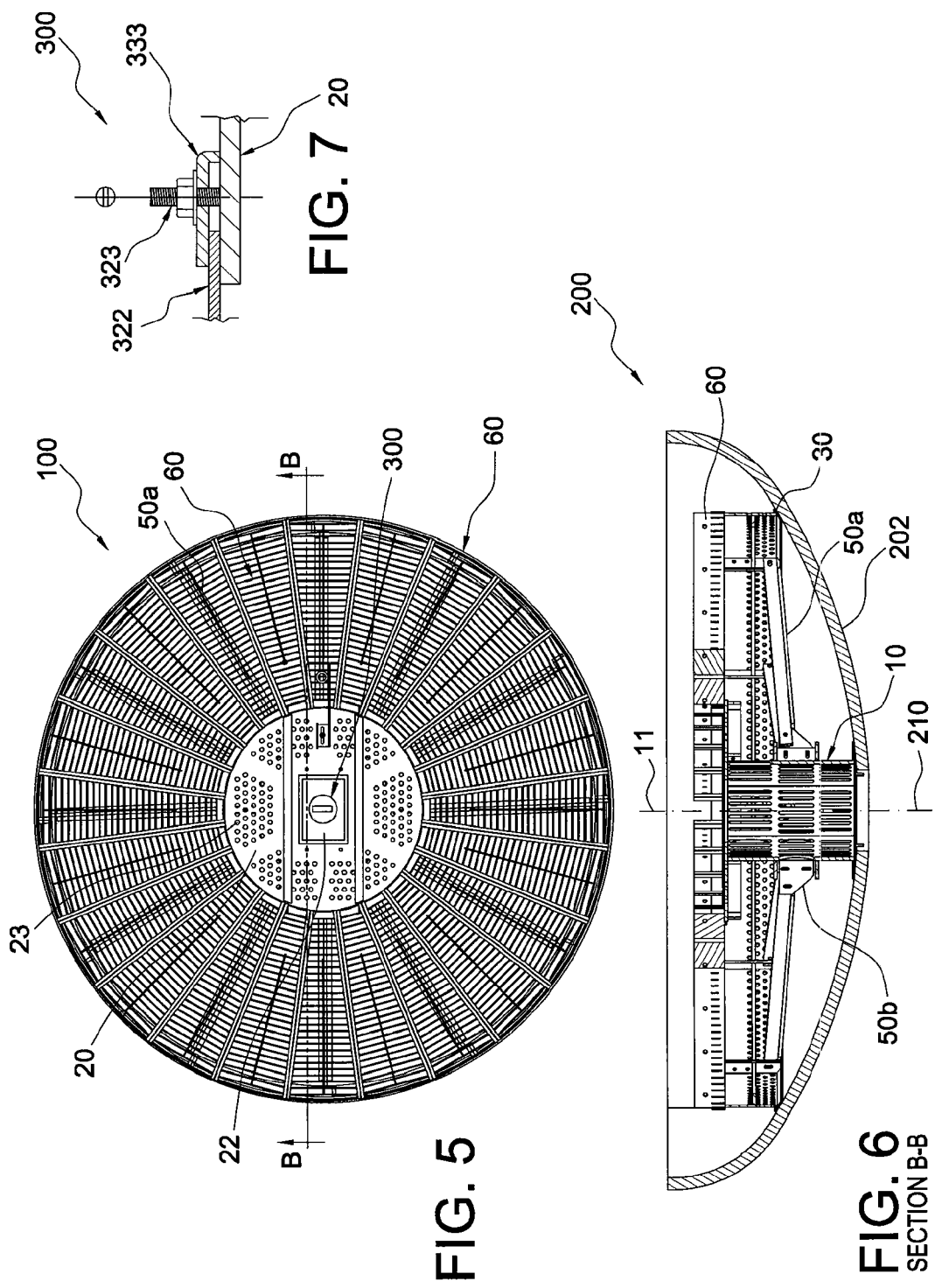

US 9,409,137 B1

CATALYST SUPPORT GRID

FIELD OF THE INVENTION

The present invention relates to the field of conversion of hydrocarbons and, more specifically, of the reforming of hydrocarbon-containing feedstock and ammonia production in a fixed bed catalytic reactor with an improved catalyst support.

BACKGROUND OF THE INVENTION

Many types of fixed bed catalyst support and retention devices have been used over the decades of chemical plant experience. Many of these devices were small and resulted in a high pressure drop of the reactors in operation. Many of the larger devices were required to be installed in the reactor pressure vessel at fabrication before closure heads were welded into place. Many of the earlier devices were also shaped as straight beams that crossed the lower tangent line of the reactor vessel in a horizontal axis to form a circular disc.

There is a need for an improved catalytic reactor with a support having a design that allows supporting of fixed pellet-type catalyst beds within the reactor pressure vessel, to prevent catalyst migration downstream while imposing the minimum possible pressure drop of the reacting fluid passing through the reactor vessel. Also needed is a support grid for a catalytic reactor that may be easily installed through a limited diameter opening in the reactor vessel. Lower catalyst bed support systems that reduce or eliminate empty or dead spaces at the bottom of conventional reactors, as well as catalyst bed support systems that allow refiners to load increasing amounts of catalyst materials into a reactor without resorting to use of inert catalyst support particle beds, which degrade over time and add significant operating costs to the refinery, are also needed.

SUMMARY OF THE INVENTION

The present invention provides catalytic reactors, catalyst supports, catalyst support grids and systems, collection systems and methods of improving energy efficiency and increasing production in gasoline fraction and/or ammonia production.

The catalyst support grid is formed of (i) a center support or support stool in the form of a cylinder; (ii) a support skirt located at the outer circumference of the grid; (iii) a set of radial support arms (rods and brackets) that extend from the center support structure to the support skirt to tie these sections into a rigid frame; and (iv) a disc or grid formed of a plurality of support grid wedges or sections that are supported by the rigid frame. The center support, the support skirt, the set of radial arms, and the disc or grid of the support grid wedges may all be formed of various parts/components that are introduced separately and assembled within the reactor vessel.

These and other features and advantages of the present invention will become apparent from the following description of the invention that is provided in connection with the accompanying drawings and illustrated embodiments of the invention.

BRIEF DESCRIPTION OF THE DRAWINGS

FIG. 5 illustrates an enlarged top view of the grid with outlet collector assembly of FIG. 4 (taken from the inside of the reactor vessel).

FIG. 6 illustrates a cross sectional view of the assembly of FIG. 5 taken along line B-B.

FIG. 7 illustrates an enlarged view of an exemplary bolt for the grid with outlet collector assembly of FIG. 4, and according to an embodiment of the present invention.

DETAILED DESCRIPTION OF THE PREFERRED EMBODIMENTS

Figure 1:
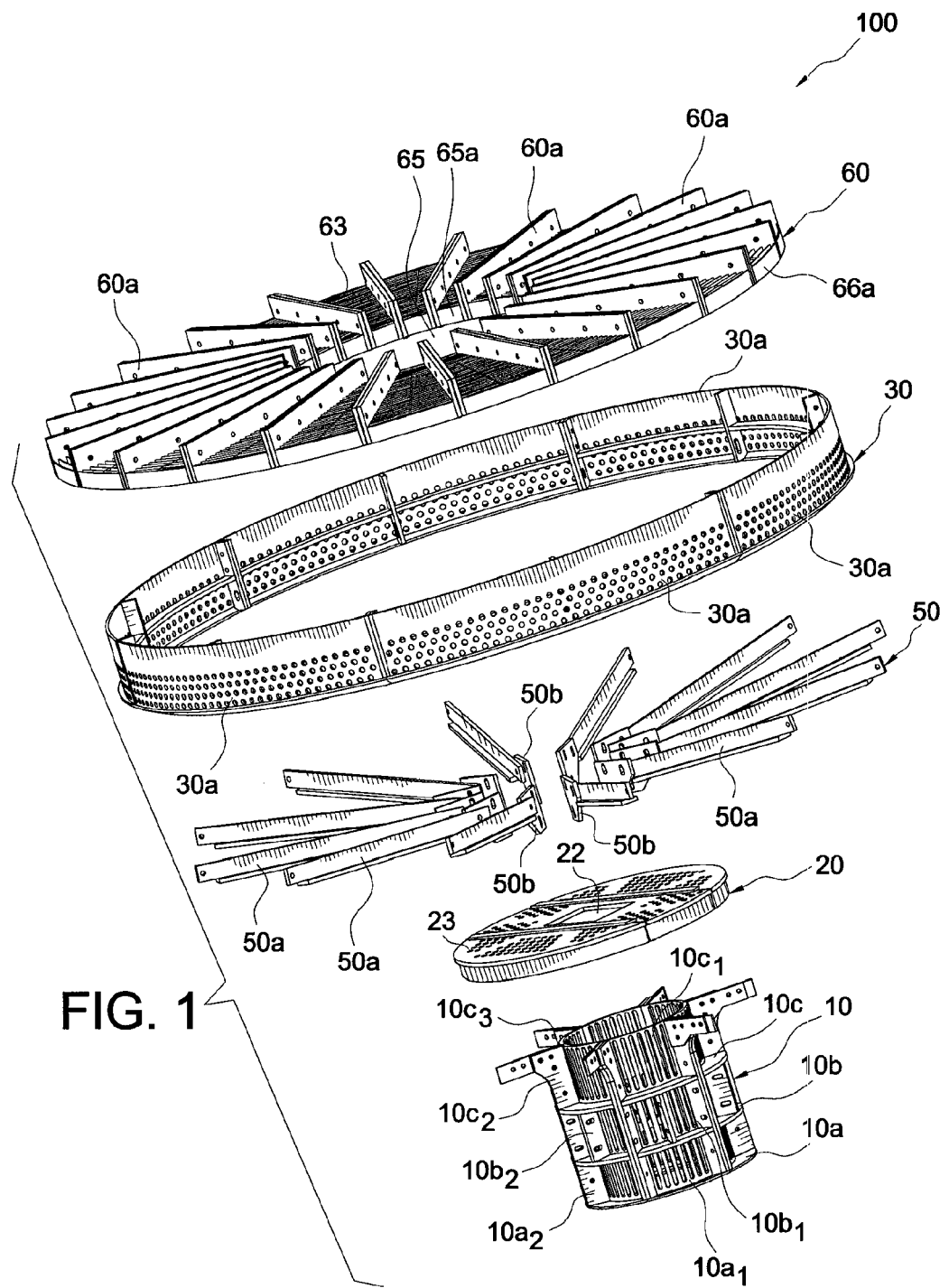
FIG. 1 illustrates an expanded view of a catalyst support grid (bottom support grid assembly) according to an exemplary embodiment of the present invention (illustrating exemplary support grid sections; support skirt sections; outlet collector rods and brackets; outlet collector plate cover; and outlet collector support stool sections).

The present invention provides catalytic reactors, catalyst support systems and/or grids, collection systems and methods of improving energy efficiency and increasing production in gasoline fraction and/or ammonia production.

The catalyst support system of the present invention is in the form of a support grid for catalytic reactors such as, for example, High and Low Temperature Shifts reactors (HTS and LTS reactors), vertical down-flow reactors, or any other type of catalytic reactor with a bed of solid catalyst particles.

In an exemplary embodiment, the present invention provides a catalyst support grid (also referred to as support, support grid, catalyst support system, support assembly, support grid assembly or catalyst bed support grid assembly) for a fixed bed catalyst of a chemical reactor, i.e., for supporting a fixed bed catalyst. The support grid has a robust design to support the catalyst bed (for example, a fixed pellet-type catalyst bed) within the reactor pressure vessel, to prevent catalyst migration downstream while imposing the minimum possible pressure drop of the reacting fluid passing through the reactor vessel. The catalyst support grid may be installed through a limited diameter opening in the reactor vessel.

In an exemplary embodiment, and as detailed below, at least one component of the catalyst support grid is modular, i.e., is formed of simple and relatively small parts (sub-parts or sub-sections) that are installed/assembled within the reactor vessel, for example, during a short operating plant shutdown. The repetitive nature of the components (sub-parts, sub-sections or sub-components) forming each component/piece of the support grid assembly allows the installation and assembling of the support grid without the use of welding or similar operations on the assembly itself, eliminating the negative effects of welding on the whole reactor and increasing the reliability of the overall process. Preferably, all components/pieces of the support grid assembly are modular, i.e., each is formed of pieces that can be assembled together and installed within the reactor vessel, independently of the other components/pieces. The assembly components are subsequently assembled together within the reactor vessel.

An exemplary support grid of the present invention comprises inter alia (i) a center support or support stool; (ii) a support skirt located at the outer circumference of the grid; (iii) a set of radial support arms (rods and brackets) that extend from the center support structure to the support skirt; and (iv) a grid or disc formed of a plurality of support grid sections or wedges.

According to another exemplary embodiment of the present invention, a catalyst support grid comprises inter alia (i) a center support or support stool in the form of a cylinder; (ii) a support skirt located at the outer circumference of the grid; (iii) a set of radial support arms (rods and brackets) that extend from the center support structure to the support skirt; and (iv) a grid or disc formed of a set of support grid wedges or sections that are radial in orientation and are supported by the rigid frame.

Another exemplary catalyst support grid of the present invention comprises inter alia (i) a center support or support stool in the form of a cylinder made of parts/areas/regions of a vertical cylinder that are assembled within the reactor vessel; (ii) a support skirt located at the outer circumference of the grid and formed of sections that are assembled inside the reactor vessel; (iii) a set of radial support arms (rods and brackets) that extend from the center support structure to the support skirt to tie these sections into a rigid frame; (iv) a set support grid wedges or sections that are radial in orientation and are assembled inside the reactor pressure vessel to form a disc or grid that is about 80% of the reactor vessel in outside diameter, the support grid wedges being supported by the rigid frame; and (v) a cover plate.

Another exemplary catalyst support grid of the present invention comprises inter alia the following modular components or modular structural parts: (i) a center support cylinder made of a plurality of portions/regions/areas of a vertical cylinder, assembled within the reaction vessel on the bottom closure head, the center support cylinder having at least one area that is perforated to allow free passage of the reactant fluid, and being centered over the reactor vessel outlet nozzle; (ii) a peripheral support skirt located at the outer circumference of the grid, the peripheral support skirt being formed of a plurality of components/regions/parts/pieces that are assembled in sections inside the reactor pressure vessel, that sets without welding to bottom closure head of the reactor vessel; (iii) a set of radial support arms (brackets and rods) that extend from the center support structure to the peripheral support skirt to tie these sections into a rigid frame; (iv) a disc or grid formed of a set of catalyst bed support grid wedges or sections that are radial in orientation and are assembled inside the reactor pressure vessel to form a disc that is about 80% of the reactor vessel in outside diameter, the wedges being supported by the rigid frame, and having the mechanical strength to support the weight of the catalyst bed and the resultant force of the pressure drop of reactant fluid as it passes through the catalyst bed in operation, wherein the open area of the support grid wedges is sufficient to impose an insignificant pressure drop on the flowing reactant fluid relative to the pressure drop through the catalyst bed; and (v) a plate cover.

As detailed below, the catalyst support grid of the present invention is designed to fit the subject reactor pressure vessel such that it may be fabricated in parts (in a remote manufacturing shop, for example) and transported to the installation site at an ammonia synthesis plant by ordinary truck, marine transportation or any other suitable means. Many or all of the parts are repetitive in design making the fabrication quicker and more economical. The parts may be fabricated of either carbon or alloy steel material, as required by the demands of the particular chemical plant.

In an exemplary embodiment, the catalyst support grid assembly may be installed in an ammonia synthesis plant syngas shift converter to restrain the catalyst bed pellets from migration downstream while lowering the overall pressure drop of the reactant syngas fluid through the reactor vessel, as opposed to the traditional design of catalyst retention devices that were small and covered only a limited area over the reactor pressure vessel outlet nozzle. According to the present invention, the new center support (if needed) is taken into the reactor vessel through the limited diameter manway opening at the top of the pressure vessel and the parts are assembled over the existing outlet nozzle by bolting. There is no welding involved on or within the reactor vessel, as the vessel has been post-weld heat-treated at fabrication and as further welding on the vessel is prohibited by recognized pressure vessel codes. The radial support arms are taken into the reactor vessel though the manway nozzle and assembled to the center support by bolting. The arc sections of the peripheral skirt are taken into the vessel through the manway and assembled into a large diameter ring by bolting to each other and outer ends of the radial arms. The catalyst support grid wedges are taken into the reactor vessel through the manway and assembled into a complete disc by bolting to each other with the inner diameter of the disc resting on the center support and the outer diameter of the disc resting on the support skirt.

Spring clips or similar structures may be provided and located in the joints between the grid wedges, to keep the joint bolting tight during startups and shutdowns of the ammonia plant as the shift converter reactor undergoes thermal cycling. Several thin layers of inert material of increasingly smaller size may be installed over the catalyst support grid to prevent the small catalyst particles from migrating to the grid face during operation. These thin layers of inert material may be similar to or different from those traditionally used in fixed catalyst bed reactors. The catalyst bed particles are loaded on top of the inert material.

Figure 2:
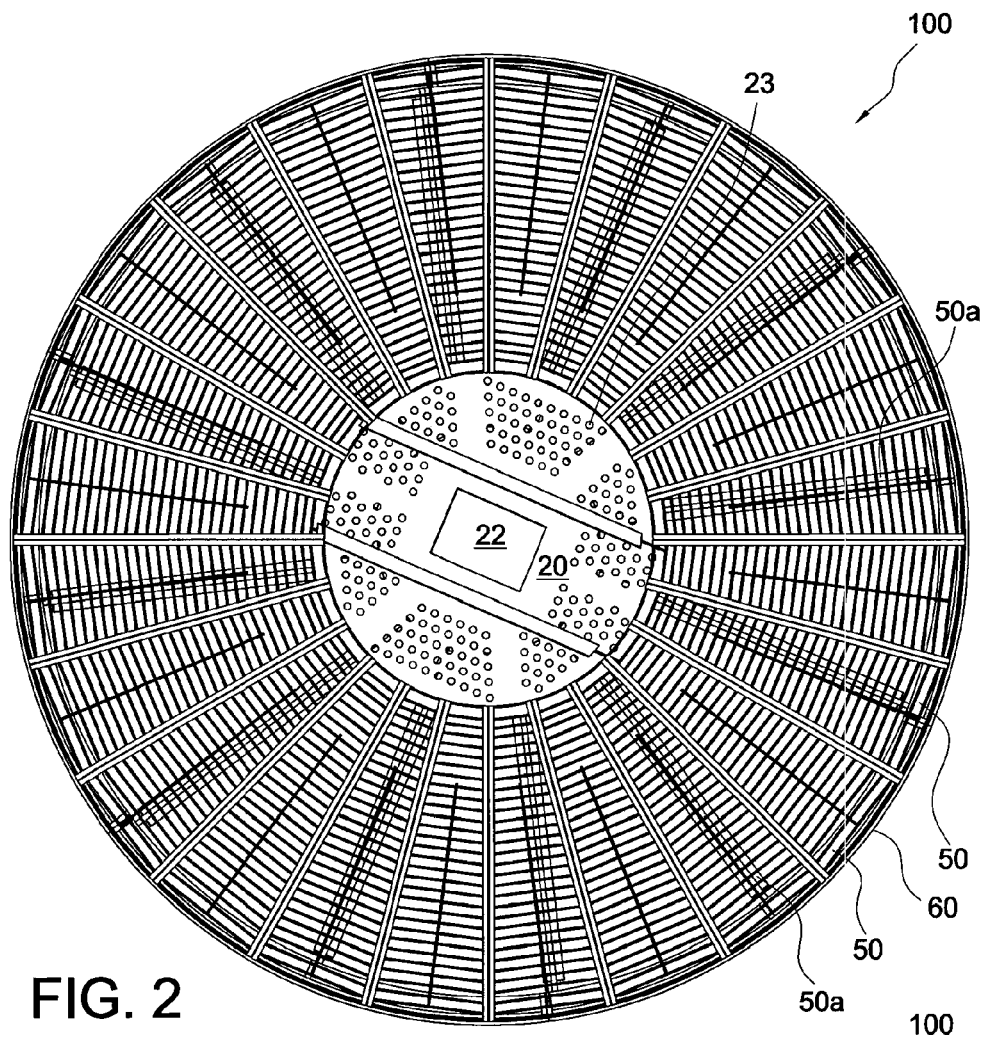
FIG. 2 illustrates a top view of the bottom support grid assembly of FIG. 1.
Figure 3:
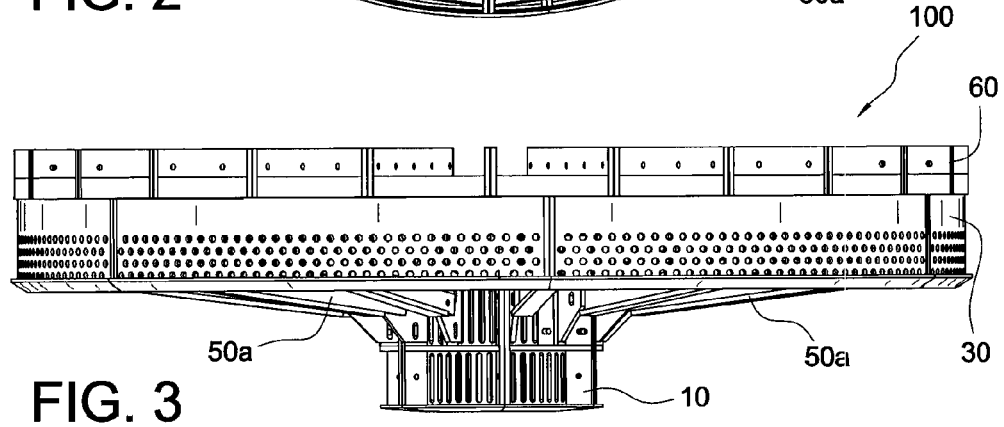
FIG. 3 illustrates a side view of the bottom support grid assembly of FIG. 1.

Referring now to the drawings, where like elements are designated by like reference numerals, FIGS. 1-3 illustrate exemplary catalyst support grid 100 (also referred to as catalyst support or assembly or system 100, catalyst bed support grid or assembly 100, bottom support grid assembly 100, or support structure 100) of the present invention. FIGS. 4-7 illustrate an exemplary reactor 200 of the present invention incorporating exemplary catalyst support grid 100 of FIG. 1.

In an exemplary embodiment, and as detailed below, the catalyst support grid 100 comprises inter alia (i) a center support 10 in the form of a cylinder 10 formed of a plurality of outlet collector support stool sections assembled together; (ii) a support skirt 30 located at the outer circumference of the grid assembly; (iii) radial support arms 50 (rods 50a and brackets 50b) that extend from the center support structure to the support skirt 30; and (iv) a disc or grid 60 formed of catalyst bed support grid wedges or sections 60a that are radial in orientation and are supported by the skirt 30.

In an exemplary-only embodiment, the catalyst support grid 100 is formed of (i) an outlet collector 10 in the form of a cylinder 10 (support stool 10); (ii) a support skirt 30 located at the outer circumference of the grid assembly and formed of six skirt sections, the six skirt sections being preferably all similar; (iii) twenty four radial support arms 50 (formed of twelve outlet connector rods 50a and twelve outlet brackets 50b) that extend from the center support structure to the support skirt; and (iv) twenty four catalyst bed support grid wedges or sections 60a that are radial in orientation and are supported by the skirt 30, the wedges forming an outer grid or disc 60.

As illustrated in FIGS. 1 and 3, the center support 10 (support stool 10) is made of areas/regions of a vertical cylinder that are assembled together and installed within the reactor vessel, on the bottom closure head. The center support 10 is provided in the form of a modular cylinder 10 formed of a plurality of vertical cylinders and of areas or parts of a cylinder, i.e., a multi-part structure formed of pieces/parts (sub-parts or sub-sections) that have similar or non-similar configuration and shape.

For example, the specific and exemplary-only embodiment shown in FIG. 1 illustrates lower part center support 10$a$ (lower cylinder section 10$a$) formed of six identical pieces or sub-parts 10$a$1, 10$a$2 ... 10$a$6, and middle part center support 10$b$ (middle cylinder section 10$b$) also formed of six identical pieces or sub-parts 10$b$1, 10$b$2 ... 10$b$6, which are similar to parts/sections 10$a$1, 10$a$2 ... 10$a$6. Top cylinder portion 10$c$ is formed of six identical pieces or sub-parts 10$c$1, 10$c$2 ... 10$c$6. All these sub-parts may be installed and assembled together by simple bolting operations and within the reactor vessel, without the need for welding or similar-type procedure. During installation within the reactor vessel, the center support 10 is centered over the reactor vessel outlet nozzle. The center support 10 is also perforated, throughout the whole cylindrical area or only some parts), to allow free passage of the reactant fluid.

The peripheral support skirt 30 (FIGS. 1 and 3) is formed of a plurality of support skirt sections 30$a$, for example of six similar support skirt sections. The support skirt sections 30$a$ have an arcuate configuration. The skirt is located at the outer circumference of the grid, assembled in sections (sub-parts) inside the reactor pressure vessel and without welding, onto the bottom closure head of the reactor vessel. The arc sections 30$a$ of the peripheral skirt 30 are taken into the vessel through the manway and assembled into a large diameter ring (i.e., skirt 30) by bolting to each other and to outer ends of the radial support arms 50 (i.e., to the connector rods 50$a$, as shown in FIG. 3).

The set of radial support arms 50 is formed of outlet connector rods 50$a$ and outlet brackets 50$b$. In an exemplary-only embodiment, the radial support arms 50 consist of twelve similar outlet connector rods 50$a$ and twelve corresponding similar outlet brackets 50$b$. The arms extend from the center support structure to the support skirt 30 to tie sections 30$a$ of support skirt 30 into a rigid frame to support the catalyst bed support grid wedges 60$a$, as detailed below. The radial support 50 arms are taken into the reactor vessel though the manway nozzle and assembled to the center support 10 by bolting. In a specific and exemplary-only embodiment, radial support arms 50 are bolted to the middle part center support 10$b$, as illustrated in FIG. 3.

Disc or grid 60 is formed of a plurality of support grid sections or wedges 60$a$, for example, of twenty four similar grid sections or wedges 60$a$. These sections (wedges or sub-parts) are radial in orientation and are assembled inside the reactor pressure vessel to form disc 60 that is about 80% of the reactor vessel in outside diameter. Grid sections 60$a$ (wedges 60$a$) of set 60 have the mechanical strength to directly support the weight of the catalyst bed and the resultant force of the pressure drop of reactant fluid as it passes through the catalyst bed in operation. The open area 63 of the support grid wedges 60$a$ is sufficient to impose an insignificant pressure drop on the flowing reactant fluid relative to the pressure drop through the catalyst bed. The catalyst support grid wedges 60$a$ are taken into the reactor vessel through the manway and assembled into a complete disc (i.e., into the disc/set 60 of support grid wedges 60$a$) by bolting to each other, with the inner diameter 65 and inner circumferential edge 65$a$ of the disc 60 resting on the center support 10, and with the outer diameter 66 and outer circumferential edge 66$a$ of the disc 60 resting on the support skirt 30.

The catalyst support grid 100 may also comprise a plate cover 20 (outlet collector plate cover 20) provided over the support stool 10, as shown in FIG. 1. Plate cover 20 is provided with opening 22 (which may have various shapes and geometries, for example, the rectangular shape shown in FIG. 2) and perforations 23 to allow passage of fluid. To permit final assembly, the outer diameter of disc 60 is about equal to the outer diameter of skirt 30, and the inner diameter of disc 60 is about equal to the outer diameter of plate cover 20, as shown in FIG. 3.

Figure 4:
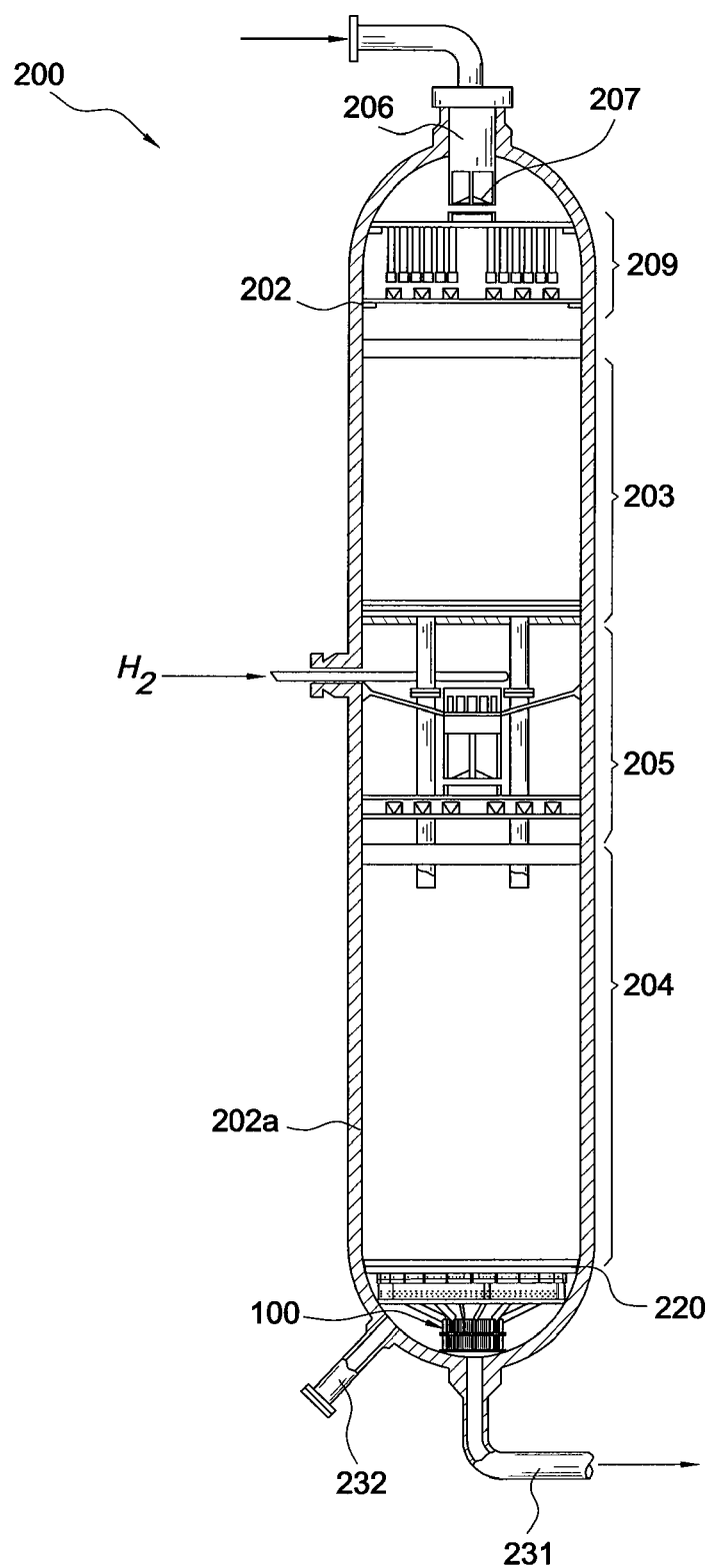
FIG. 4 illustrates a schematic view of a reactor with the bottom support grid assembly of FIG. 1.

An exemplary reactor 200 that may be fitted or retrofitted with the catalyst support grid 100 of the present invention is shown in FIG. 4. In fixed-bed hydroprocessing reactors such as reactor 200, gas and liquid reactants (e.g. hydrogen and a hydrocarbonaceous feedstock) flow downward through one or more beds of solid catalyst extrudates. As the reactants flow downward through the catalyst beds, the reactants react to produce the desired products. Gas phase reactants such as hydrogen are consumed, and heat is generated by the catalytic reactions.

Exemplary vertical, down-flow reactor 200 shown in FIG. 4 includes a reactor vessel 202 with an inner wall 202$a$ and having upper and lower catalyst zones 203, 204 which abut quench zone 205, located between the upper and lower catalyst zones 203, 204. A liquid feedstock is introduced into the vessel 202 via a line 206 through inlet 207. The feedstock is distributed across a distribution assembly 209 adapted to uniformly spray the feedstock across the top of the upper catalyst zone 203. Reactor 200 also includes support grid assembly 100 that supports catalyst bed 220, preferably a pellet-type catalyst bed 220. Catalyst bed 220 may contain packed catalytic extrudates supported on the catalyst bed support 100 of the present invention. The catalyst bed support 100 is affixed to the vessel shell inner wall 202$a$. Support center 10 in the form of a vertical cylinder extends in a direction about parallel to longitudinal axis 210 of reactor vessel 202 (FIG. 6) so that, preferably, longitudinal axis 11 of the support center 10 coincides with the longitudinal axis 210 of reactor vessel 202.

The reactor 200 may further include an outlet 231 for discharging product effluent from the reactor 100 during commercial service, and a catalyst drain tube 232 for removing spent catalyst extrudates during turnaround operations. The catalyst drain tube 232 extends downwardly from the bottom of the reactor 200.

FIG. 5 illustrates an enlarged top view of the grid with outlet collector assembly 100 (catalyst support grid 100) of FIG. 4 taken from the inside of the reactor vessel 202. FIG. 6 illustrates a cross sectional view of the assembly of FIG. 5 taken along line B-B. Support center 10 in the form of a vertical cylinder extends in a direction about parallel to longitudinal axis 210 of reactor vessel 202 (FIG. 6) so that, preferably, longitudinal axis 11 of the support center 10 coincides with the longitudinal axis 210 of reactor vessel 202. Preferably, support skirt 30, outlet collector arms 50 and disc or grid 60 are assembled within the reactor vessel 202, and then to the support center 10, so that these structures are oriented about perpendicular to the longitudinal axis 11 of the support center 10 to form final catalyst support grid 100 (assembly 100).

FIG. 7 illustrates an enlarged view of an exemplary bolt assembly 300 for the grid with outlet collector assembly of FIG. 4, and according to an embodiment of the present invention, showing a threaded stud 323 with nut and washer, a J clip 333, cover plate 20, and inspection hatch 322.

Some of the advantages of employing support grid 100 of the present invention in a reactor such as reactor 200 are as follows:

at least some of the parts (preferably all) of support grid 100 may be fabricated remotely from the installation site and easily shipped using ordinary transport;

the parts are largely repetitive in design and fabrication, thus making engineering and fabrication time minimum. The radial design allows the use of simple structures and design without having to calculate or allow for asymmetric loading of linear beams as in the prior art reactors;

the parts may be introduced through a small diameter manway, as is typical in many catalytic reactor vessels, meaning that the design may be used as an aftermarket improvement to the reactor;

there is no welding required to be performed on the reactor pressure vessel during installation as welding is prohibited by code in most instances. There is no welding required on the grid itself, eliminating the chance of an unintentional arc strike on the pressure vessel during installation;

the repetitive nature of the assembly of relatively small parts means that a small crew may install the grid quickly during a short operating plant shutdown;

the spring clips between the wedges allow the grid to adjust itself during thermal cycling operation. This also limits the amount of rigid bolted joints that can make assembly of the overall support grid more challenging to the field personnel; and the large open area of the grid means that the overall reactor pressure drop in operation will be substantially reduced from the typical small size retention devices used in the past. This reduction in pressure drop means increased production capacity and/or increased thermal efficiency of the operating chemical unit.

In the reactor 200 illustrated in FIG. 4, the lowermost or bottom catalyst bed 220 is supported above the outlet using the catalyst support grid 100 which is employed in lieu of a horizontal catalyst tray or a bed of inert material (such as inert ceramic spheres). The horizontal catalyst trays or beds of inert material produce empty or dead spaces at the bottom of the reactor. In addition, the amount of active catalyst that can be loaded into the lower catalyst bed is limited by the static load limits of the horizontal tray. This limitation is significant because available feedstocks are become increasingly disadvantaged, requiring more hydroprocessing which, in turn, necessitates loading more catalyst material into existing reactors.

The catalyst bed support grid 100 of the present invention reduces or eliminates empty or dead spaces at the bottom of conventional reactors. In addition, the novel catalyst bed support system of the present invention allows refiners to load increasing amounts of catalyst materials into a reactor, without resorting to use of inert catalyst support particle beds, which degrade over time and add significant operating costs to the refinery.

The catalyst support grid 100 of the present invention may be employed in hydroprocessing reactors used in the petroleum and chemical processing industries for carrying out catalytic reactions of hydrocarbonaceous feedstocks in the presence of hydrogen, at elevated temperatures and pressures. Exemplary reactions including hydrotreating, hydrofinishing, hydrocracking and hydrodewaxing, among many others.

The support grid of the present invention consists of (i) a center support cylinder, made in areas of a vertical cylinder that is assembled within the vessel on the bottom closure head. The center support cylinder is perforated in some manner to allow free passage of the reactant fluid. The center support cylinder is centered over the reactor vessel outlet nozzle; (ii) a peripheral support skirt located at the outer circumference of the grid, assembled in sections inside the reactor pressure vessel, that sets without welding to bottom closure head of the reactor vessel; (iii) a set of radial support arms that extend from the center support structure to the support skirt to tie these sections into a rigid frame to support the catalyst bed support grid wedges; and (iv) a set of catalyst bed support grid wedges that are radial in orientation and are assembled inside the reactor pressure vessel to form a disc that is about 80% of the reactor vessel in outside diameter; these wedges have the mechanical strength to support the weight of the catalyst bed and the resultant force of the pressure drop of reactant fluid as it passes through the catalyst bed in operation. The open area of the support grid wedges is sufficient to impose an insignificant pressure drop on the flowing reactant fluid relative to the pressure drop through the catalyst bed.

While the present invention is described herein with reference to illustrative embodiments for particular applications, it should be understood that the invention is not limited thereto. Those having ordinary skill in the art and access to the teachings provided herein will recognize additional modifications, applications, embodiments and substitution of equivalents within the scope of the invention. Accordingly, the invention is not to be considered as limited by the foregoing description.

What is claimed is:

1. A reactor, comprising:
    a reactor vessel having an internal surface, a top and a bottom;
    a catalyst bed located within the reactor vessel; and
    a catalyst support grid in communication with the reactor internal surface and supporting the catalyst bed, the catalyst support grid being located at the bottom of the reactor vessel, the catalyst support grid comprising a support center centered over a reactor vessel outlet nozzle at the bottom of the reactor vessel, a peripheral support skirt located at an outer circumference of the catalyst support grid, a plurality of horizontally positioned arms that extend radially from the support center to the support skirt to tie together sections of the support skirt into a rigid frame, and a disc or grid formed of a plurality of support grid sections or wedges,
    wherein the disc or grid is supported by the support skirt, and wherein an inner diameter and an inner circumferential edge of the disc or grid rest on the support center, and an outer diameter and outer circumferential edge of the disc or grid rest on the support skirt.

2. The reactor of claim 1, wherein the catalyst support is a fixed-bed catalyst support.

3. The reactor of claim 1, wherein at least one of the support center, the support skirt, the plurality of horizontally positioned arms, and the disc or grid formed of the plurality of support grid sections or wedges is modular.

4. The reactor of claim 1, wherein at least one of the support center, the support skirt, the plurality of horizontally positioned arms, and the plurality of support grid sections or wedges is formed of a plurality of sub-sections or sub-parts that are assembled within the reactor vessel.

5. The reactor of claim 4, wherein the plurality of sub-sections or sub-parts are assembled without welding.

6. The reactor of claim 1, wherein each of the support center, the support skirt, the plurality of horizontally positioned arms, and the disc or grid formed of the plurality of support grid sections or wedges is formed of a plurality of sub-parts or sub-components that are assembled within the reactor vessel by bolting and without welding.

7. The reactor of claim 1, wherein the support center is in the form of a cylinder formed of a plurality of separate pieces.

8. The reactor of claim 1, wherein the support center is in the form of a cylinder formed of sub-parts or sub-components that are bolted together.

9. The reactor of claim 1, wherein the support skirt is formed of six separate sections that are similar and that are assembled within the reactor vessel.

10. The reactor of claim 1, wherein the support skirt is provided with a plurality of openings of perforations.

11. The reactor of claim 1, wherein the plurality of horizontally positioned arms consists of twelve outlet connector rods and twelve outlet brackets.

12. The reactor of claim 1, wherein the disc or grid consists of twenty four support grid sections or wedges.

13. The reactor of claim 12, wherein the plurality of support grid sections or wedges support directly the catalyst bed.

14. A catalyst support grid assembly for a bottom of a chemical rector, the catalyst support grid assembly consisting of:
- a support center in the form of a cylinder formed of a plurality of cylinder sections, the support center being centered over an outlet nozzle of the chemical reactor;
- a peripheral support skirt located on an outer circumference of the catalyst support grid assembly, the peripheral support skirt being formed of a plurality of skirt sections;
- a plurality of radial support arms extending from an outer surface of the support center and in a horizontal direction to the peripheral support skirt, the plurality of radial support arms supporting the peripheral support skirt and tying the plurality of support skirt sections into a rigid frame;
- a disc or grid formed of a plurality of support wedges or sections that extend radially and horizontally, wherein the disc or grid is supported by the rigid frame, wherein an inner diameter and an inner circumferential edge of the disc or grid rest on the support center, and an outer diameter and outer circumferential edge of the disc or grid rest on the peripheral support skirt; and
- a cover plate having a circular configuration and provided with a central opening, the cover plate being located over the support center, and wherein the outer diameter of the disc or grid is about equal to an outer diameter of the support skirt and wherein the inner diameter of the disc or grid is about equal to an outer diameter of the cover plate.

15. The catalyst support grid assembly of claim 14, wherein the plurality of cylinder sections is assembled within the chemical reactor to form the support center.

16. The catalyst support grid assembly of claim 15, wherein the plurality of cylinder sections is assembled within the chemical reactor by bolts and nuts, and without welding.

17. The catalyst support grid assembly of claim 14, wherein the plurality of skirt sections is assembled within the chemical reactor to form the peripheral support skirt.

18. The catalyst support grid assembly of claim 17, wherein the plurality of skirt sections is assembled within the chemical reactor by bolts and nuts, and without welding.

19. The catalyst support grid assembly of claim 14, wherein the plurality of radial support arms comprise a plurality of support rods and a plurality of support brackets that are assembled within the chemical reactor and with the peripheral support skirt to form the rigid frame.

20. The catalyst support grid assembly of claim 19, wherein the plurality of radial support arms comprise a plurality of support rods and a plurality of support brackets that are assembled within the chemical reactor and with the peripheral support skirt by bolts and nuts, and without welding.

21. The catalyst support grid assembly of claim 14, wherein the plurality of wedges or sections is assembled within the chemical reactor to form the disc or grid.

22. The catalyst support grid assembly of claim 14, wherein the plurality of wedges or sections is assembled within the chemical reactor by bolts and nuts, and without welding.

23. The catalyst support grid assembly of claim 14, wherein the chemical rector is a fixed bed catalytic reactor.

24. A method of fitting or retrofitting a catalytic reactor, the method comprising the steps of:
- providing a catalytic reactor comprising a reactor vessel with a longitudinal axis and at least one manway, an inlet for introducing a feedstock, and an outlet for discharging product effluent; and
- installing a catalyst support grid within the reactor vessel and at a bottom of the reactor vessel by inserting sub-parts or sub-components of separate components forming the catalyst support grid through the at least one manway and then assembling the sub-parts or sub-components within the reactor vessel to form the separate components of the catalyst support grid.

25. The method of claim 24, wherein the step of assembling the sub-parts or sub-components within the reactor vessel is conducted by bolting.

26. The method of claim 24, wherein the step of assembling the sub-parts or sub-components within the reactor vessel is conducted without welding.

27. The method of claim 24, wherein the catalyst support grid comprises a support center, a support skirt, a plurality of horizontally positioned arms, and a disc or grid formed of a plurality of support grid sections or wedges.

28. The method of claim 24 further comprising the steps of providing a catalytic bed over the catalyst support grid and conducting at least one catalytic chemical reaction.

* * * * *